INVENTOR.
WILLIAM W. MEDLINSKI

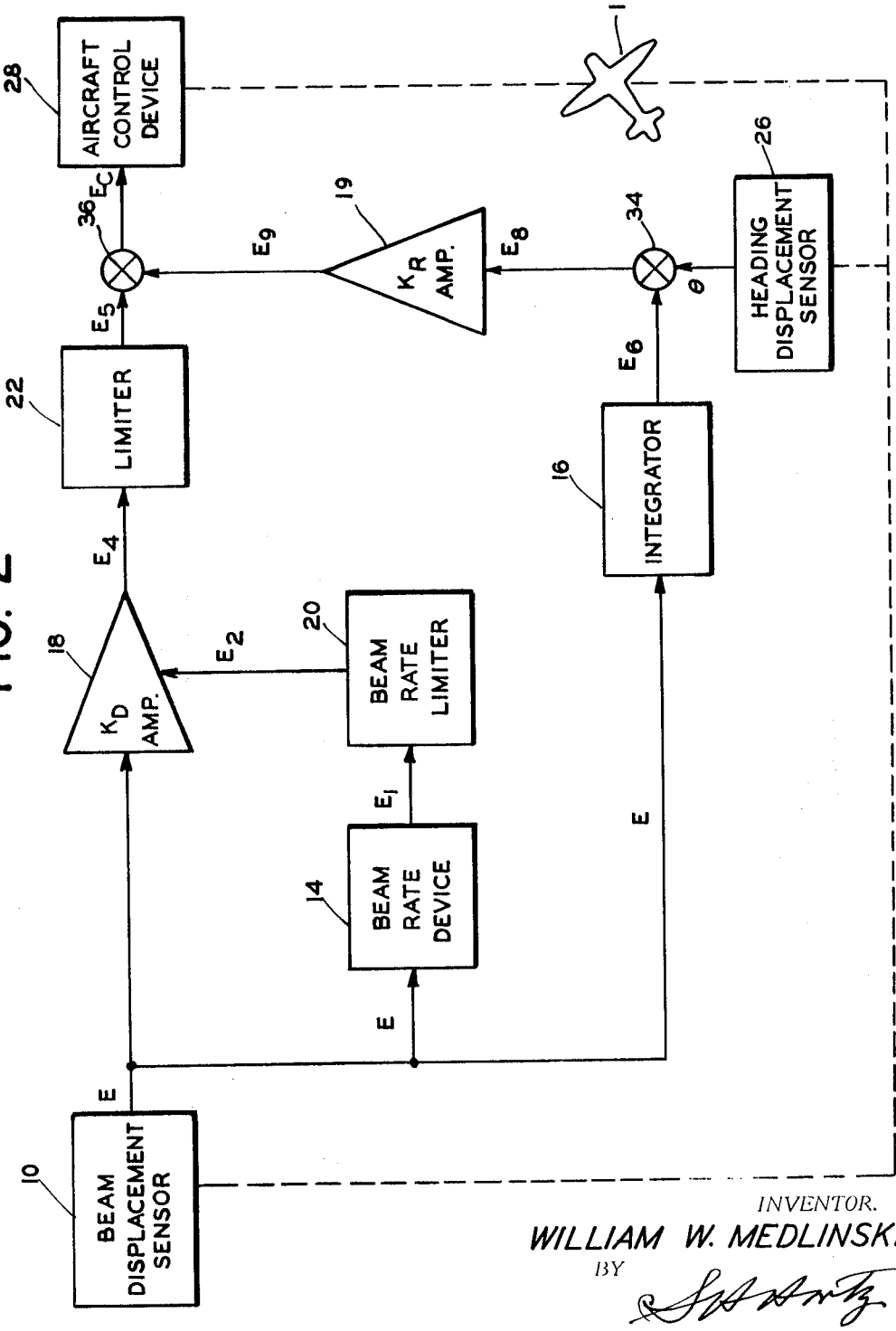

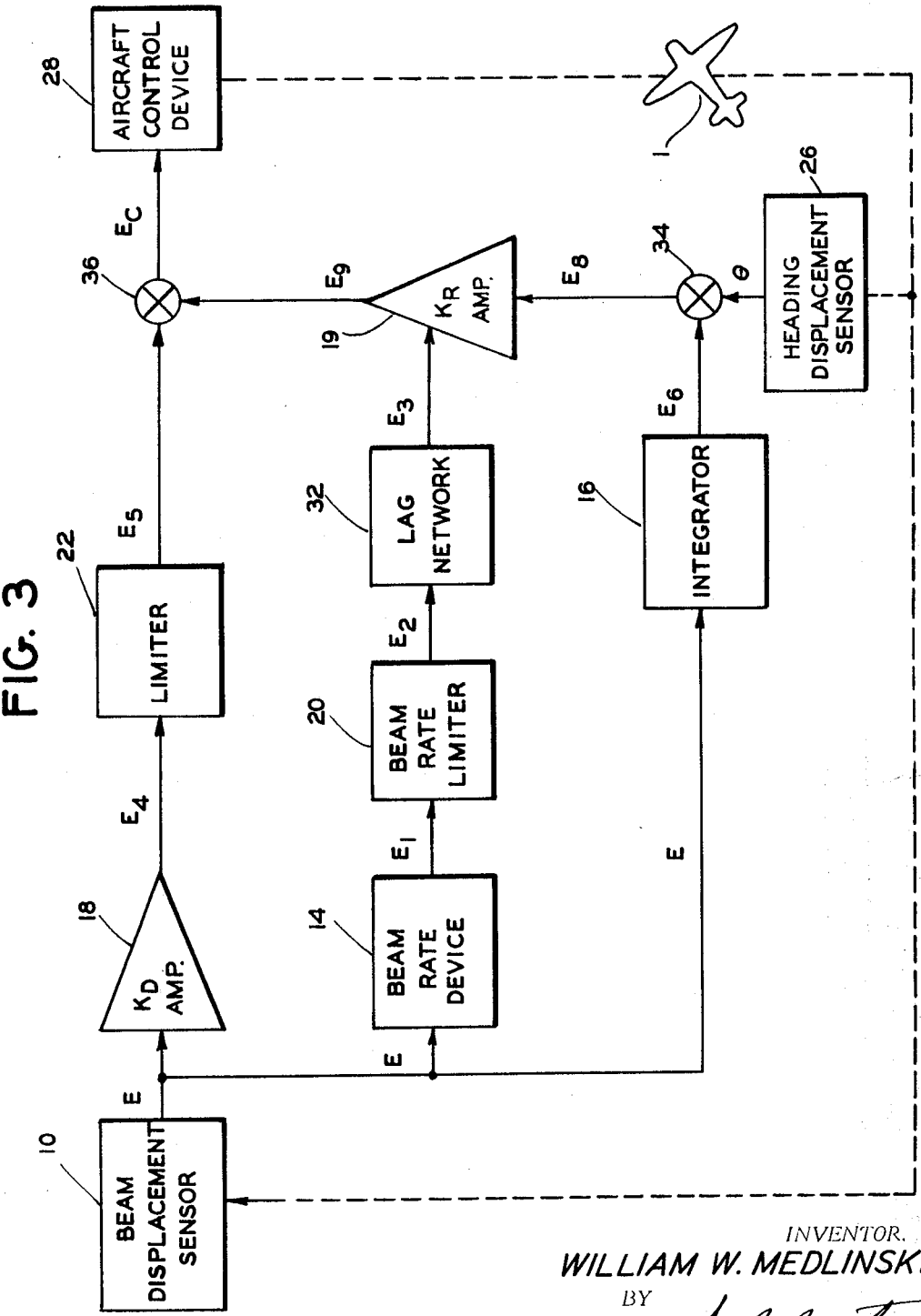

3,361,391
GAIN ADJUSTMENT MEANS FOR
BEAM COUPLERS
William W. Medlinski, Clifton, N.J., assignor to The
Bendix Corporation, a corporation of Delaware
Filed Sept. 29, 1965, Ser. No. 491,148
15 Claims. (Cl. 244—77)

ABSTRACT OF THE DISCLOSURE

Apparatus for controlling an aircraft in response to beam displacement signals and heading displacement signals. A gain adjustment device changes the gain of one of said signals to change the ratio of beam displacement signal gain to heading displacement signal gain in response to beam rate signals.

This invention relates to flight control systems and, more particularly, to apparatus for controlling and a method of flying an aircraft in response to gain adjusted signals.

In order to maintain stability and accuracy when controlling an aircraft in response to beam displacement and/or beam rate signals as the aircraft flies along a localizer or glide slope radio beam and approaches the radio transmitter, the gain adjustment of the beam coupler must be changed. Heretofore, this has been accomplished by decreasing the ratio of beam displacement signal gain to heading displacement signal gain as a function of distance from the radio transmitter. However, beam irregularities may result in erratic aircraft maneuvers, and to overcome this the beam displacement and/or beam rate signals are filtered to provide lag characteristics, thus decreasing tracking accuracy.

The main object of this invention is to decrease the ratio of beam displacement signal gain to heading displacement signal gain as a function of beam rate by decreasing beam displacement signal gain or by increasing heading displacement signal gain, or both.

Another object of this invention is to change signal gain without decreasing tracking accuracy.

The present invention contemplates apparatus for controlling an aircraft. Beam displacement signals, heading displacement signals and beam rate signals are provided. A control device controls the aircraft in response to the beam displacement signals and the heading displacement signals and a gain device changes the ratio of beam displacement signal gain to heading displacement signal gain in response to the beam rate signals.

The present invention further contemplates a method of flying an aircraft along a radio beam as the aircraft approaches a radio transmitter. The aircraft is controlled in response to beam displacement signals and heading displacement signals, and the ratio of beam displacement signal gain to heading displacement signal gain is changed in response to beam rate.

The foregoing and other objects and advantages of the invention will apear more fully hereinafter from a consideration of the detailed description which follows, taken together with the accompanying drawings wherein two embodiments of the invention are illustrtaed by way of example. It is to be expressly understood, however, that the drawings are for illustration purposes only and are not to be construed as defining the limits of the invention.

In reference to the drawings, wherein corresponding parts have been indicated by corresponding numerals:

FIGURE 2 is a block diagram of one embodiment of the invention showing a novel flight control system in which the ratio of beam displacement gain to heading displacement gain is decreased by decreasing beam displacement gain.

FIGURE 3 is a block diagram of another embodiment of the invention showing a novel flight control system in which the ratio of beam displacement signal gain to heading displacement signal gain is decreased by increasing heading displacement signal gain.

Figure 1:
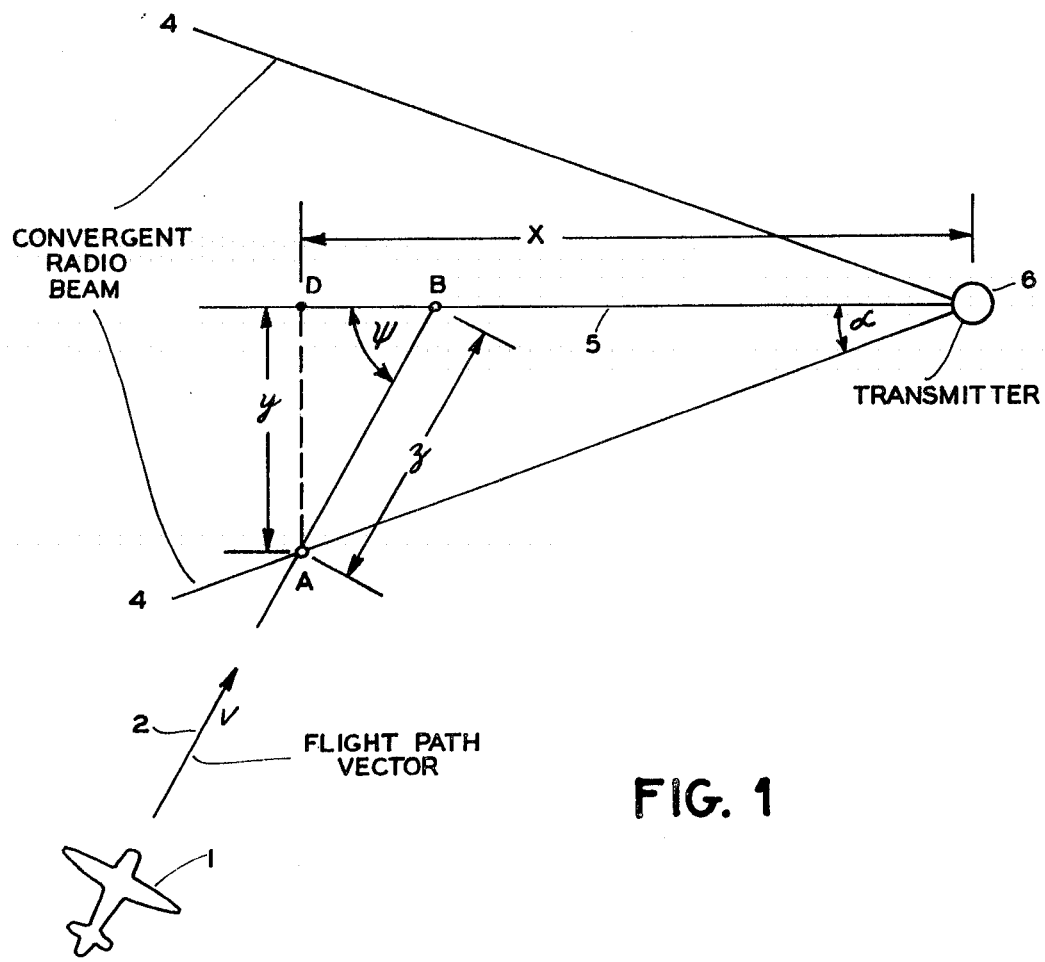
FIGURE 1 is a diagrammatic representation showing the flight path of an aircraft in relation to a convergent radio beam.

In reference to FIGURE 1, an aircraft 1, having a groundspeed V and a flight path indicated by a vector 2, intersects a convergent radio beam 4 at a point A, and flies toward center line 5 of beam 4 at an angle $\psi$. The distance from a radio transmitter 6 to a point D on center line 5 is designated by X, with points A and D arranged so that line AD is perpendicular to center line 5. Flight path vector 2 intersects center line 5 at a point B. The distance from A to D is represented by $y$, and the distance from A to B is represented by $z$. The angular displacement of aircraft 1, at point A, from beam center line 5 is designated by $\alpha$.

The time $t$ required to traverse distance $z$ is $$t = \frac{z}{V}$$

By appropriate trigonometric substitution, an expression for angle $\alpha$ in terms of ground speed V, time $t$ and distance X is as follows:

$$\operatorname{Tan} \alpha = \frac{Vt \sin \psi}{X}$$

Since, in application, $\alpha$ is a small angle, with its sine and tangent being equal to the angle expressed in radians, the equation may be written as follows:

$$\alpha \approx \frac{57.3 Vt \sin \psi}{X} \quad (1)$$

Differentiating Equation 1, and considering that angle $\psi$ is small, the equation for beam rate $\dot{\alpha}$ is as follows:

$$\dot{\alpha} = \frac{d\alpha}{dt} = \frac{57.3 V \sin \psi}{X} = K\left(\frac{V\psi}{X}\right) \quad (2)$$

As aircraft 1 approaches transmitter 6, at a velocity V and heading displacement $\psi$, X decreases so that beam rate $\dot{\alpha}$ increases. In order to decrease the ratio of beam displacement signal gain to heading displacement signal gain as a function of $\dot{\alpha}$, this ratio must be inversely proportional to $\dot{\alpha}$, and may be expressed as follows:

$$\frac{1}{\dot{\alpha}} = \frac{K_D}{K_R} \quad (3)$$

where $K_D$ represents beam displacement signal gain, and $K_R$ represents heading displacement signal gain. The beam displacement signal is proportional to angle $\alpha$ and the heading displacement signal is proportional to angle $\psi$, with angle $\psi$ corresponding to aircraft heading relative to a preset beam reference for a localizer coupler, and to aircraft attitude relative to a preset glide slope for a glide path coupler.

First embodiment of the invention

In reference to FIGURE 2, a beam displacement sensor, which may be a conventional radio type device mounted in aircraft 1, provides a beam displacement signal E, which is proportional to angular displacement $\alpha$ of aircraft 1 from beam center line 5 as shown in FIGURE 1. Signal E is applied to a beam rate device 14, an integrator 16 and an amplifier 18 having a variable gain $K_D$.

A conventional type heading sensor 26 provides a heading displacement signal $\theta$, which corresponds to the heading of the aircraft relative to the preset heading of the beam center line and is proportional to angle $\psi$ shown in FIGURE 1. Integrator 16 integrates signal E to provide an integrating signal $E_6$ to correct any long term changes in heading which may occur. Signal $\theta$ and signal $E_6$ are combined at summation point 34 to provide a summation signal $E_8$. Signal $E_8$ is applied to an amplifier 19 having a variable gain $K_R$ to provide a gain adjusted signal $E_9$. The ratio of beam displacement signal gain to heading displacement signal gain is $K_D/K_R$ in Equation 3.

Beam rate device 14, which is a lead circuit having an appropriate time constant, is responsive to the rate of change of signal E and provides a beam rate signal $E_1$ proportional to beam rate $\dot{\alpha}$ in Equation 3.

In order to effect appropriate aircraft control, signal E is of one polarity when the beam center line is approached from one side, and of the opposite polarity when the beam center line is approached from the other side. Beam rate device 14 is arranged to be insensitive to the polarity of signal E, and signal $E_1$ corresponds to the absolute rate of change of signal E.

Signal $E_1$ is applied to a beam rate limiter 20, and limited to an appropriate value, to provide signal $E_2$. Amplifier 18 is connected to beam rate limiter 20 and is arranged so that variable gain $K_D$ changes in inverse proportion to signal $E_2$. Since signal $E_2$ increases as aircraft 1 approaches transmitter 6, gain $K_D$ decreases and decreases gain ratio $K_D/K_R$. Gain adjusted signal $E_4$ is provided at the output of amplifier 18 and is limited by a limiter 22 to provide a signal $E_5$.

Signals $E_5$ and $E_9$ are combined at a summation point 36 to provide a control signal $E_c$. Control signal $E_c$ is directed to an aircraft control device 28, which may be an automatic pilot or flight director system for controlling aircraft 1.

Second embodiment of the invention

In reference to FIGURE 3, beam displacement sensor 10 provides signal E which is applied to amplifier 18 to provide signal $E_4$. Signal $E_4$ is applied to limiter 22 which provides signal $E_5$, and applied to beam rate sensor 14 which provides beam rate signal $E_1$, with signal $E_1$ limited by rate limiter 20 to provide signal $E_2$. Signal $E_2$ is applied to a lag network 32, which provides a signal $E_3$, having delay characteristics relative to signal $E_2$, to prevent any sudden changes in gain which may be applied.

Signal E is applied to integrator 16 to provide integrating signal $E_6$, and signal $E_6$ is combined with heading displacement signal $\theta$ from heading sensor 26 at summation point 34 to provide summation signal $E_8$. Amplifier 19 receives signal $E_3$ and signal $E_8$, and is arranged so that variable gain $K_R$ changes in direct proportion to signal $E_3$. Since signal $E_3$ increases as aircraft 1 approaches transmitter 6, gain $K_R$ increases and decreases gain ratio $K_D/K_R$. Gain adjusted signal $E_9$ is provided at the output of amplifier 19 and combined with signal $E_5$ at summation point 36 to provide control signal $E_c$. Control signal $E_c$ is applied to aircraft control device 28.

Operation

A device constructed according to the invention changes the gain of either the beam displacement signal or the heading displacement signal to decrease the beam displacement signal to heading displacement signal gain ratio $K_D/K_R$ as a function of beam rate $\dot{\alpha}$, with $\dot{\alpha}$ increasing as aircraft 1 approaches transmitter 6.

In the first embodiment of the invention, amplifier 18 is controlled by beam rate $\dot{\alpha}$, and variable gain $K_D$ changes in inverse proportion to signal $E_2$. Since signal $E_2$ increases as aircraft 1 approaches transmitter 6, beam displacement signal gain $K_D$ and gain ratio $K_D/K_R$ decrease.

In the second embodiment of the invention, amplifier 19 also is controlled by beam rate $\dot{\alpha}$, and variable gain $K_R$ changes in direct proportion to signal $E_3$. Since signal $E_3$ increases as aircraft 1 approaches transmitter 6, heading displacement signal gain $K_R$ increases and gain ratio $K_D/K_R$ decreases.

In some instances it may be desirable to change one of the gains, or both, as a function of absolute beam rate $\dot{\alpha}$ in accordance with Equation 3. This makes it possible to select a minimum beam displacement signal to heading displacement signal gain ratio to provide a wide variation in tracking accuracy, or to select a maximum ratio to provide any degree of overall damping. Since beam rate signal $E_2$ and beam rate signal $E_3$ correspond to absolute rate of change of beam displacement signal E, beam irregularities are attenuated to provide gain adjustment without decreasing tracking accuracy.

While two embodiments of the invention have been illustrated and described in detail, it is to be expressly understood that the invention is not limited thereto. For example, the invention has been described with reference to localizer couplers having heading sensors to provide heading displacement signal, but is adaptable as well to glide path couplers using pitch attitude sensors to provide the heading displacement signals. Various changes may also be made in the design and arrangement of parts without departure of the spirit and scope of the invention.

What is claimed is:

1. A flight control system for an aircraft, comprising means for providing beam displacement signals, means for providing heading displacement signals, means for providing beam rate signals, aircraft control means connected to the beam displacement signal means and connected to the heading displacement signal means for controlling the aircraft in response to the beam displacement signals and the heading displacement signals, a first variable gain amplifier connected to the beam displacement signal means, a second variable gain amplifier connected to the heading displacement signal means, and the beam rate signal means connected to one of said amplifiers for changing the gain thereof so as to change the ratio of beam displacement signal gain to heading displacement signal gain in response to the beam rate signals.

2. A flight control system for an aircraft, comprising means for providing beam displacement signals, means for providing heading displacement signals, means for providing beam rate signals, aircraft control means connected to the beam displacement signal means and connected to the heading displacement signal means for controlling the aircraft in response to the beam displacement signals and the heading displacement signals, a variable gain amplifier connected to the beam displacement signal means, and the beam rate signal means connected to the variable gain amplifier for decreasing beam displacement signal gain in response to the beam rate signals so as to decrease the ratio of beam displacement signal gain to heading displacement signal gain.

3. A flight control system for an aircraft, comprising means for providing beam displacement signals, means for providing heading displacement signals, means for providing beam rate signals, aircraft control means connected to the beam displacement signal means and connected to the heading displacement signal means for controlling the aircraft in response to the beam displacement signals and the heading displacement signals, a variable gain amplifier connected to the heading displacement signal means, and the beam rate signal means connected to the variable gain amplifier for decreasing the ratio of beam displacement signal gain to heading displacement signal gain by increasing heading displacement signal gain in response to the beam rate signals.

4. A flight control system for an aircraft, comprising means for providing beam displacement signals, means for providing heading displacement signals, means connected to the beam displacement signal means and responsive to the absolute rate of change of the beam displacement signals for providing beam rate signals, aircraft control means connected to the beam displacement signal means and connected to the heading displacement signal means for controlling the aircraft in response to the beam displacement signals and the heading displacement signals, a first variable gain amplifier connected to the beam displacement signal means, a second variable gain amplifier connected to the heading displacement signal means, and the beam rate signal means connected to one of said amplifiers for changing the gain thereof so as to change the ratio of beam displacement signal gain to heading displacement signal gain in response to the beam rate signals.

5. Means for changing the ratio of beam displacement signal gain to heading displacement signal gain, comprising means for providing beam displacement signal gain, means for providing heading displacement signal gain, means for providing beam rate signals, and the last mentioned means being connected to one of the gain providing means for changing the gain in accordance with the beam rate signals to change the ratio.

6. Means for changing the ratio of beam displacement signal gain to heading displacement signal gain, comprising means for providing one of the displacement signal gains, means for providing beam rate signals, and the last mentioned means being connected to the gain providing means for changing the gain in accordance with the beam rate signals to change the ratio.

7. A flight control system, comprising means for providing beam displacement signals, means for providing heading displacement signals, means for providing beam rate signals, means connected to one of the displacement signal means and connected to the beam rate signal means for providing gain adjusted displacement signals in response to the beam rate signals, and means responsive to the gain adjusted displacement signals and the other displacement signals for controlling the aircraft.

8. A flight control system, comprising means for providing beam displacement signals, means for providing heading displacement signals, means for providing beam rate signals, aircraft control means connected to the beam displacement signal means and connected to the heading displacement signal means for controlling the aircraft in response to the beam displacement signals and the heading displacement signals, means connected to the beam rate signal means for limiting the beam rate signals, a variable gain amplifier connected to the beam displacement signal means, and the means for limiting the beam rate signals connected to the variable gain amplifier for decreasing beam displacement signal gain to decrease the ratio of beam displacement signal gain to heading displacement signal gain in response to the limited beam rate signals.

9. A flight control system for an aircraft, comprising means for providing beam displacement signals, means for providing heading displacement signals, means for providing beam rate signals, aircraft control means connected to the beam displacement signal means and connected to the heading displacement signal means for controlling the aircraft in response to the beam displacement signals and the heading displacement signals, limiting means connected to the beam rate signal means for limiting the beam rate signals, means connected to the limiting means for providing lagging limited beam rate signals, a variable gain amplifier connected to the heading displacement signal means, and the last mentioned means connected to the variable gain amplifier for increasing heading displacement signal gain to decrease the ratio of beam displacement signal gain to heading displacement signal gain in response to the limited lagging beam rate signals.

10. A flight control system, comprising means for providing beam displacement signals, means for providing heading displacement signals, means for providing beam rate signals, first gain adjustment means connected to one of the displacement signal means for providing gain adjusted displacement signals, second gain adjustment means connected to the other displacement signal means and connected to the beam rate signal means for providing other gain adjusted displacement signals in response to the beam rate signals, and means being connected to the first gain adjustment means and to the second gain adjustment means and responsive to the first mentioned gain adjusted displacement signals and the other gain adjusted displacement signals for controlling the aircraft.

11. A method of flying an aircraft along a radio beam as the aircraft approaches a radio transmitter, comprising controlling the aircraft in response to beam displacement signals and heading displacement signals, and changing the ratio of beam displacement signal gain to heading displacement signal gain by adjusting the gain of one of the displacement signals in response to beam rate.

12. A method of flying an aircraft along a radio beam as the aircraft approaches a radio transmitter, comprising controlling the aircraft in response to beam displacement signals and heading displacement signals, and decreasing the ratio of beam displacement signal gain to heading displacement signal gain by decreasing beam displacement signal gain in response to beam rate.

13. A method of flying an aircraft along a radio beam as the aircraft approaches a radio transmitter, comprising controlling the aircraft in response to beam displacement signals and heading displacement signals, and decreasing the ratio of beam displacement signal gain to heading displacement signal gain by increasing heading displacement signal gain in response to beam rate.

14. A system for controlling an aircraft, comprising means for providing beam displacement signals, means for providing heading displacement signals, means for providing beam rate signals, a limiter connected to the beam rate signal means for providing limited beam rate signals, gain adjustment means connected to the beam displacement signal means and connected to the limiter and controlled by the limited beam rate signals for adjusting the gain of the beam displacement signals, another limiter connected to the gain adjusting means for limiting the gain adjusted beam displacement signals, an integrator connected to the beam displacement signal means for integrating the beam displacement signals to provide integrated signals, and means being connected to the heading displacement signal means and to the integrator and to the other limiter for controlling the aircraft in response to the heading displacement signals, the integrated signals and the limited gain adjusted beam displacement signals.

15. A system for controlling an aircraft, comprising means for providing beam displacement signals, means for providing heading displacement signals, means for providing beam rate signals, an integrator connected to the beam displacement signal means for integrating the beam displacement signals to provide integrated signals, summing means connected to the integrator and to the heading displacement signal means for summing the integrated signals and the heading displacement signals to provide summation signals, a limiter connected to the beam rate signal means for limiting the beam rate signals, lag means connected to the limiter for providing lagging limited beam rate signals, gain adjustment means connected to the summing means and connected to the lag means and controlled by the limited lagging beam rate signals for adjusting the gain of the summation signals, another limiter connected to the beam displacement signal means for limiting the beam displacement signals, and means being connected to the other limiter and to the gain adjustment means for controlling the aircraft in response to the limited beam displacement signals and the gain adjusted summation signals.

References Cited

UNITED STATES PATENTS

| | | | |
|---|---|---|---|
| 2,423,336 | 7/1947 | Moseley | 244—77 |
| 2,881,990 | 4/1959 | Kutzler | 244—77 |
| 2,932,023 | 4/1960 | Haskins | 244—77 |
| 2,996,271 | 8/1961 | Lindahl | 244—77 |
| 3,099,007 | 7/1963 | Kittrell | 244—77 |

MILTON BUCHLER, *Primary Examiner.*

B. BELKIN, *Assistant Examiner.*